United States Patent
Batshon (12)

(10) Patent No.: US 6,381,902 B1
(45) Date of Patent: May 7, 2002

(54) POT HOLDER FOR USE WITH POSTS

(76) Inventor: Abeer Batshon, 1280 Glenthorpe Dr., Diamond Bar, CA (US) 91789

( * ) Notice: Subject to any disclaimer, the term of this patent is extended or adjusted under 35 U.S.C. 154(b) by 0 days.

(21) Appl. No.: 09/659,438

(22) Filed: Sep. 8, 2000

(51) Int. Cl.[7] .................................................. A01G 9/02
(52) U.S. Cl. ............................................................. 47/86
(58) Field of Search ................................. 47/65.5, 66.1, 47/66.3, 66.4, 66.5, 66.6, 66.7, 67, 85, 86

(56) References Cited

U.S. PATENT DOCUMENTS 5,960,587 A * 10/1999 Brasseur, Jr. et al. ........... 47/86

FOREIGN PATENT DOCUMENTS

FR 2651662 A1 * 9/1989

* cited by examiner

*Primary Examiner*—Michael J. Carone
*Assistant Examiner*—Francis T. Palo
(74) *Attorney, Agent, or Firm*—Goldstein Law Offices, P.C.

(57) ABSTRACT

A pot holder for use with posts including a pot portion having a generally cylindrical configuration. The pot portion has an open upper end, a closed lower end, and a surrounding side wall therebetween. The pot portion has an elongated cylinder positioned centrally therein. The elongated cylinder has an open upper end positioned within the open upper end of the pot portion. The elongated cylinder has an open lower end extending through the closed lower end of the pot portion. The elongated cylinder is dimensioned for receiving the post therethrough.

3 Claims, 3 Drawing Sheets

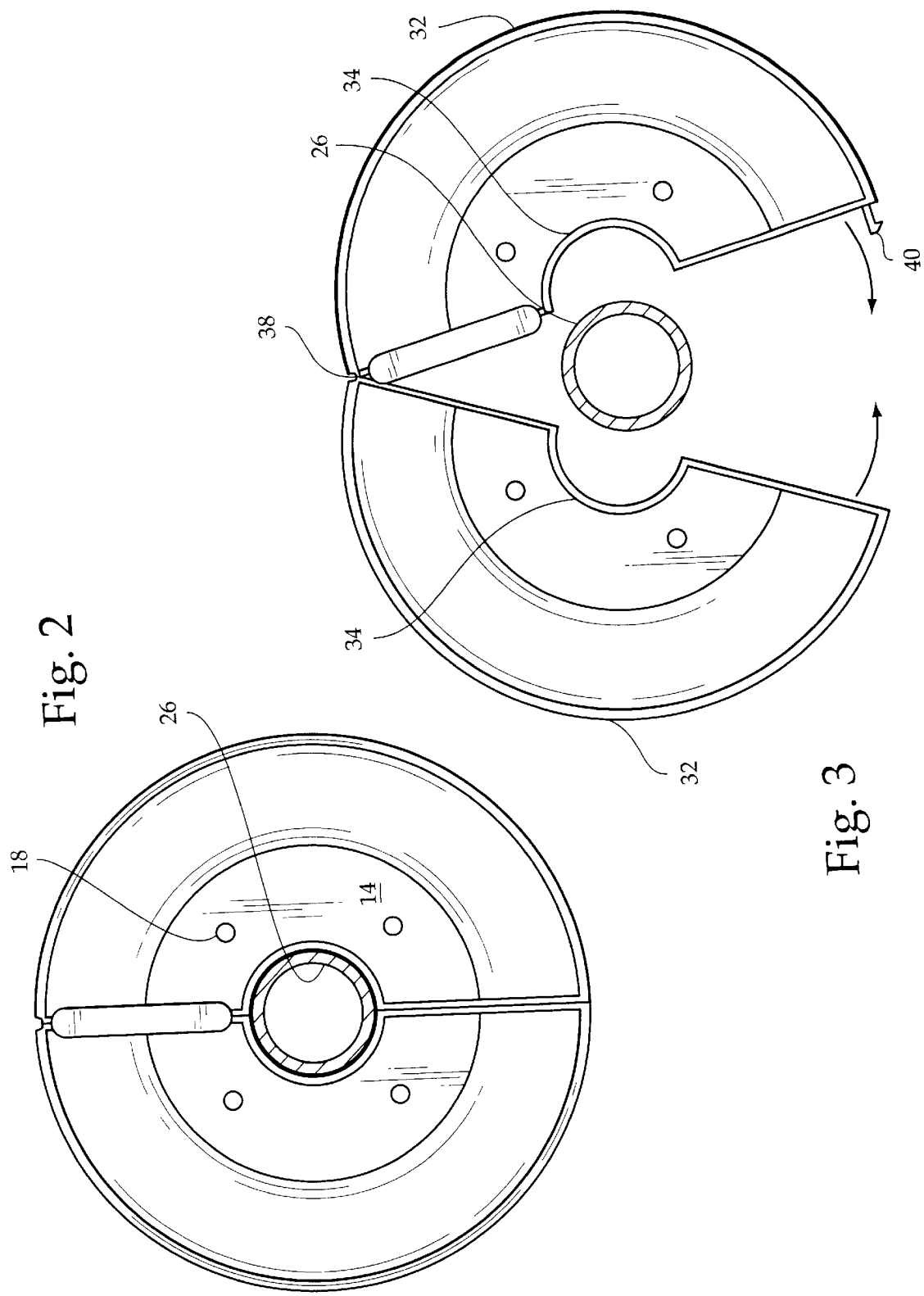

POT HOLDER FOR USE WITH POSTS

BACKGROUND OF THE INVENTION

The present invention relates to a pot holder for use with posts and more particularly pertains to allowing potted plants and flowers to secure to and surround a post.

The use of plant holding devices is known in the prior art. More specifically, plant holding devices heretofore devised and utilized for the purpose of holding and supporting plants and flowers are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,908,982 to Quatrini discloses a plant hanger for supporting baskets on an outdoor post. U.S. Pat. No. Des. 400,823 to Bagshaw and Des. 405,027 to McElwain disclose various ornamental designs for umbrella supported potted plants.

While these devices fulfill their respective, particular objective and requirements, the aforementioned patents do not describe a pot holder for use with posts for allowing potted plants and flowers to secure to and surround a post.

In this respect, the pot holder for use with posts according to the present invention substantially departs from the conventional concepts and designs of the prior art, and in doing so provides an apparatus primarily developed for the purpose of allowing potted plants and flowers to secure to and surround a post.

Therefore, it can be appreciated that there exists a continuing need for a new and improved pot holder for use with posts which can be used for allowing potted plants and flowers to secure to and surround a post. In this regard, the present invention substantially fulfills this need.

SUMMARY OF THE INVENTION

In the view of the foregoing disadvantages inherent in the known types of plant holding devices now present in the prior art, the present invention provides an improved pot holder for use with posts. As such, the general purpose of the present invention, which will be described subsequently in greater detail, is to provide a new and improved pot holder for use with posts which has all the advantages of the prior art and none of the disadvantages.

To attain this, the present invention essentially comprises a pot portion having a generally cylindrical configuration. The pot portion has an open upper end, a closed lower end, and a surrounding side wall therebetween. The closed lower end has a plurality of drainage apertures therein. The pot portion has an elongated cylinder positioned centrally therein. The elongated cylinder has an open upper end positioned within the open upper end of the pot portion. The elongated cylinder has an open lower end extending through the closed lower end of the pot portion. The elongated cylinder is dimensioned for receiving the post therethrough. The pot portion is divided into two symmetrical semi-cylindrical segments hingedly coupled together along a single side with the elongated cylinder divided into two symmetrical semi-cylindrical segments. The pot portion includes a locking clasp for maintaining the pot portion in a closed orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pot holder for use with posts which has all the advantages of the prior art plant holding devices and none of the disadvantages.

It is another object of the present invention to provide a new and improved pot holder for use with posts which may be easily and efficiently manufactured and marketed.

It is a further object of the present invention to provide a new and improved pot holder for use with posts which is of durable and reliable construction.

An even further object of the present invention is to provide a new and improved pot holder for use with posts which is susceptible of a low cost of manufacture with regard to both materials and labor, and which accordingly is then susceptible of low prices of sale to the consuming public, thereby making such a pot holder for use with posts economically available to the buying public.

Even still another object of the present invention is to provide a new and improved pot holder for use with posts for allowing potted plants and flowers to secure to and surround a post.

Lastly, it is an object of the present invention to provide a new and improved pot holder for use with posts including a pot portion having a generally cylindrical configuration. The pot portion has an open upper end, a closed lower end, and a surrounding side wall therebetween. The pot portion has an elongated cylinder positioned centrally therein. The elongated cylinder has an open upper end positioned within the open upper end of the pot portion. The elongated cylinder has an open lower end extending through the closed lower end of the pot portion. The elongated cylinder is dimensioned for receiving the post therethrough.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a plan view of the present invention illustrated in a closed orientation.

FIG. 3 is a plan view of the present invention illustrated in an open orientation.

The same reference numerals refer to the same parts through the various figures.

DESCRIPTION OF THE PREFERRED EMBODIMENT

Figure 1:
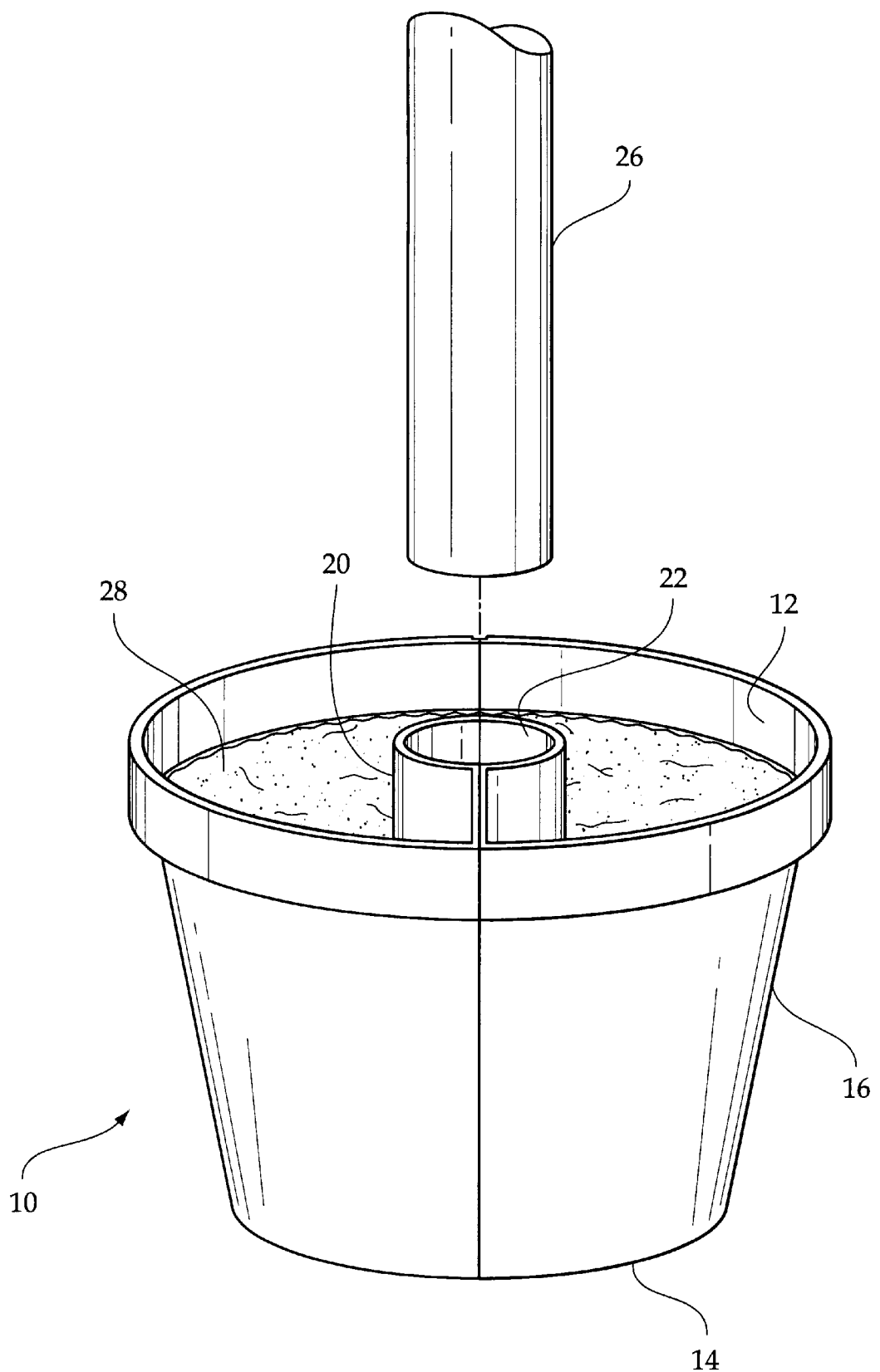
FIG. 1 is a perspective view of the preferred embodiment of the pot holder for use with posts constructed in accordance with the principles of the present invention.
Figure 4:
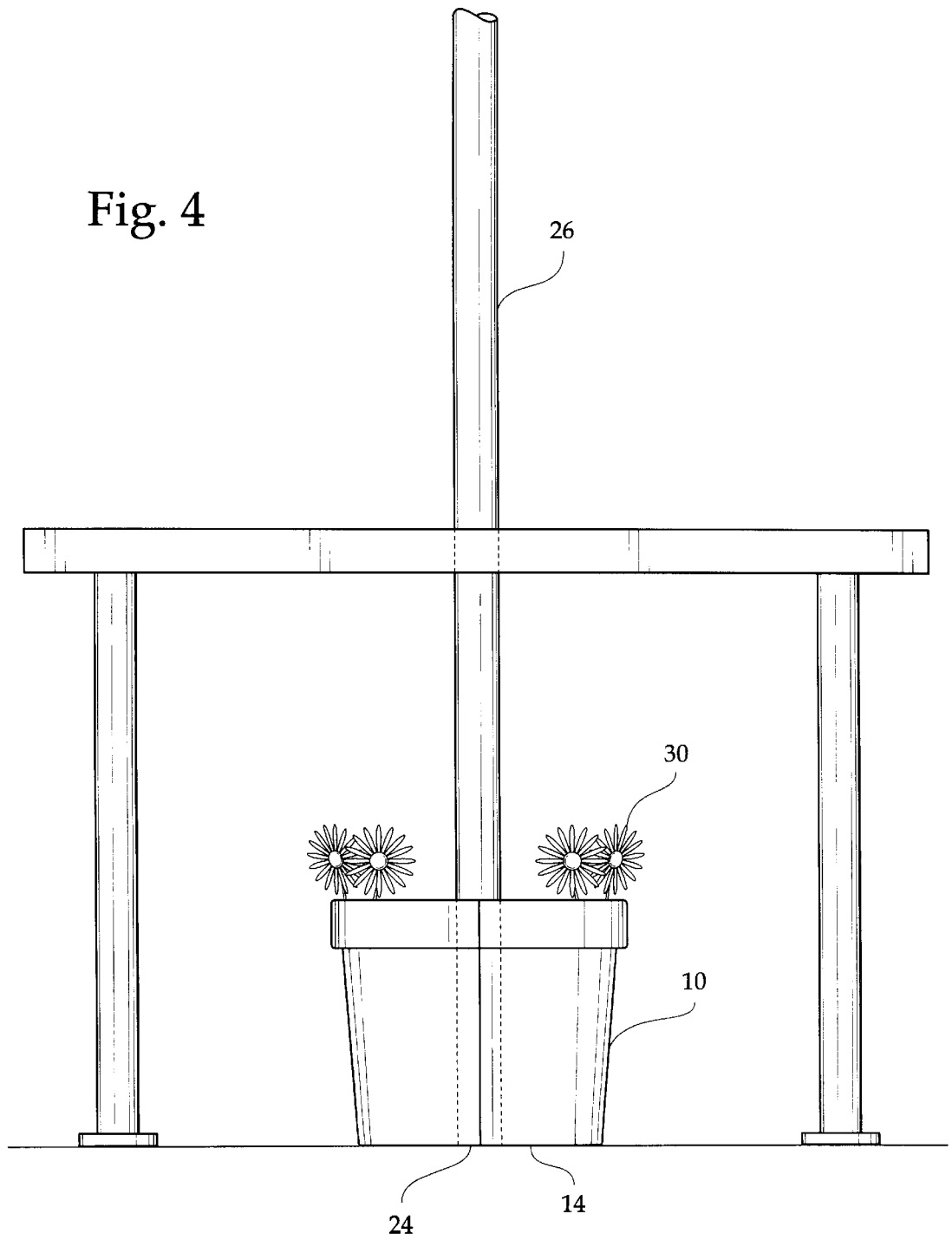
FIG. 4 is a side view of the present invention illustrated in use.

With reference now to the drawings, and in particular, to FIGS. 1 through 4 thereof, the preferred embodiment of the new and improved pot holder for use with posts embodying the principles and concepts of the present invention and generally designated by the reference number 10 will be described.

Specifically, it will be noted in the various figures that the device relates to a pot holder for use with posts for allowing potted plants and flowers to secure to and surround a post.

The present invention is essentially comprised of a pot portion 10. The pot portion 10 has a generally cylindrical configuration. The pot portion 10 has an open upper end 12, a closed lower end 14, and a surrounding side wall 16 therebetween. The closed lower end 14 has a plurality of drainage apertures 18 therein. The pot portion 10 has an elongated cylinder 20 positioned centrally therein. The elongated cylinder 20 has an open upper end 22 positioned within the open upper end 12 of the pot portion 10. The elongated cylinder 20 has an open lower end 24 extending through the closed lower end 14 of the pot portion 10. The elongated cylinder 22 is dimensioned for receiving the post 26 therethrough. The pot portion 10 can be filled with dirt 28 that will surround the elongated cylinder 20 within the pot portion 10. Plants and flowers 30 can then be planted within the dirt 28. The pot portion 10 can be divided into two symmetrical semi-cylindrical segments 32 hingedly coupled together along a single side with the elongated cylinder 20 divided into two symmetrical semi-cylindrical segments 34. A plastic strip 38 is used to create the hinged coupling between the segments 32, 34. Note FIGS. 2 and 3. The pot portion 10 includes a locking clasp 40 for maintaining the pot portion 10 in a closed orientation. Thus, the pot portion 10 can be opened and placed around the post 26 and then closed to engage the locking clasp 40 to prevent separation from the post 26. The symmetrical semi-cylindrical segments 32, 34 will be tightly held together by the locking clasp 40 whereby a water-tight seal will be created. The dirt 28 can then be added to the pot portion 10 as it is seated around the post 26. Flowers and plants can then be planted in the dirt 28 to create an aesthetic surrounding while preserving space at the same time. Note FIG. 4.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pot holder for use with posts for allowing potted plants and flowers to secure to and surround a post, the pot holder comprising, in combination:

a pot portion having a generally cylindrical configuration, the pot portion having an open upper end, a closed lower end, and a surrounding side wall therebetween, the closed lower end having a plurality of drainage apertures therein, the pot portion having an elongated cylinder positioned centrally therein, the elongated cylinder having an open upper end positioned within the open upper end of the pot portion, the elongated cylinder having an open lower end extending through the closed lower end of the pot portion, the elongated cylinder being dimensioned for receiving the post therethrough, the pot portion being divided into two symmetrical semi-cylindrical segments hingedly coupled together along a single side with the elongated cylinder divided into two symmetrical semi-cylindrical segments, the pot portion including a locking clasp for maintaining the pot portion in a closed orientation.

2. A pot holder for use with posts for allowing potted plants and flowers to secure to and surround a post, the pot holder comprising, in combination:

a pot portion having a generally cylindrical configuration, the pot portion having an open upper end, a closed lower end, and a surrounding side wall therebetween, the pot portion having an elongated cylinder positioned centrally therein, the elongated cylinder having an open upper end positioned within the open upper end of the pot portion, the elongated cylinder having an open lower end extending through the closed lower end of the pot portion, the elongated cylinder being dimensioned for receiving a post therethrough, said pot portion divided into two symmetrical semi-cylindrical segments hingedly coupled together along a single side with the elongated cylinder divided into two symmetrical semi-cylindrical segments.

3. The pot holder for use with posts as set forth in claim 2, wherein the pot portion includes a locking clasp for maintaining the pot portion in a closed orientation.

* * * * *